(12) United States Patent
Kroczka et al.

(10) Patent No.: US 11,795,812 B2
(45) Date of Patent: Oct. 24, 2023

(54) CONTINUOUS ASSESSMENT OF WELL ELEMENTS USING FIBER OPTICS

(71) Applicant: Landmark Graphics Corporation, Houston, TX (US)

(72) Inventors: Sebastian Kroczka, Cracow (PL); Welton Danniel Souza, Dan Haag (NL); Chafaa Badis, Lons (FR); Kashyap Choksey, Sugar Land, TX (US); John Maida, Houston, TX (US)

(73) Assignee: Landmark Graphics Corporation, Houston, TX (US)

(*) Notice: Subject to any disclaimer, the term of this patent is extended or adjusted under 35 U.S.C. 154(b) by 468 days.

(21) Appl. No.: 17/075,166

(22) Filed: Oct. 20, 2020

(65) Prior Publication Data

US 2021/0222540 A1 Jul. 22, 2021

Related U.S. Application Data

(60) Provisional application No. 62/962,661, filed on Jan. 17, 2020.

(51) Int. Cl.
*E21B 29/10* (2006.01)
*G01N 21/952* (2006.01)
*E21B 47/10* (2012.01)
*E21B 47/00* (2012.01)

(52) U.S. Cl.
CPC ............ *E21B 47/10* (2013.01); *E21B 47/006* (2020.05)

(58) Field of Classification Search
CPC ........ E21B 29/10; E21B 47/00; E21B 47/003; E21B 47/006; E21B 47/07; E21B 47/10; G01M 11/086; G01M 5/0025; G01M 5/0033; G01N 21/952; G01N 21/65
See application file for complete search history.

(56) References Cited

U.S. PATENT DOCUMENTS

| 2003/0094281 A1* | 5/2003 | Tubel ................ G01V 8/16 166/250.03 |
| 2009/0123119 A1 | 5/2009 | Varkey |
| 2010/0142903 A1 | 6/2010 | Dowd et al. |

(Continued)

FOREIGN PATENT DOCUMENTS

GB 2477241 7/2011

OTHER PUBLICATIONS

Application No. PCT/US2020/056484, International Search Report and Written Opinion, dated Jan. 29, 2021.

(Continued)

*Primary Examiner* — Sang H Nguyen
(74) *Attorney, Agent, or Firm* — Kilpatrick Townsend & Stockton LLP

(57) ABSTRACT

A well system includes a fiber-optic cable positionable downhole along a length of a wellbore. The well system further includes an opto-electrical interface to communicatively couple to the fiber-optic cable to monitor a gas released from a well element within the wellbore. Further, the well system includes a processing device and a memory device that includes instructions executable by the processing device. The instructions cause the processing device to detect hydrogen absorption by the fiber-optic cable within the wellbore and determining a location of deterioration of the well element using the detected hydrogen absorption by the fiber-optic cable.

19 Claims, 8 Drawing Sheets

(56) References Cited

U.S. PATENT DOCUMENTS

| | | | |
|---|---|---|---|
| 2011/0088462 A1* | 4/2011 | Samson | E21B 47/10 356/342 |
| 2012/0018167 A1 | 1/2012 | Konopczynski et al. | |
| 2012/0081699 A1* | 4/2012 | Ford | E21B 47/114 356/128 |
| 2015/0063418 A1* | 3/2015 | Wysocki | E21B 47/135 374/161 |
| 2015/0247818 A1* | 9/2015 | Silvester | G01N 27/49 429/492 |
| 2020/0018149 A1* | 1/2020 | Luo | E21B 47/12 |

OTHER PUBLICATIONS

Lino et al., "Mechanisms of Hydrogen-Induced Losses in Silica-Based Optical Fibers", Nov. 1990, 22 pp.

Stone et al., "Interactions of Hydrogen and Deuterium with Silica Optical Fibers", May 1987, 22 pp.

\* cited by examiner

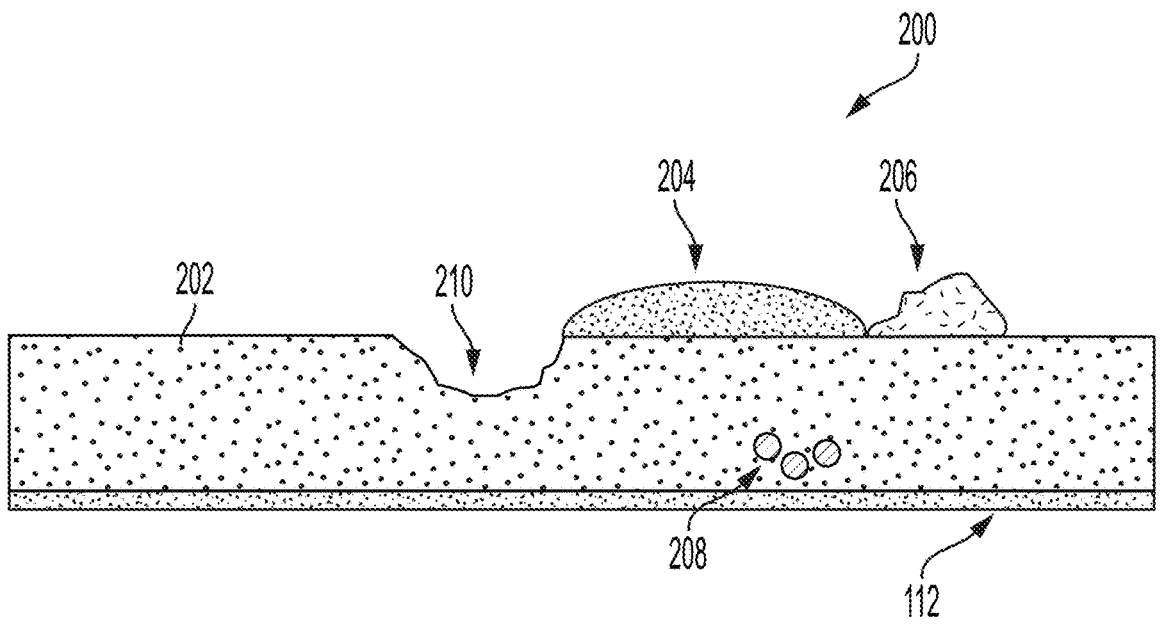

Chemical Reactions:

$Fe \rightarrow Fe^{2+} + 2e^-$ — Oxidation reaction (pH independent)
$2H^+ + 2e^- \rightarrow H_2$ — Reduction reaction in acid solution
$2H_2O + 2e^- \rightarrow H_2 + 2OH^-$ — Reduction reaction in neutral or slightly alkaline solution $Fe + 2H_2O \rightarrow Fe(OH)_2 + H_2$ — Anaerobic corrosion reaction in water
$Fe^{2+}(aq) + 2OH^-(aq) \rightarrow Fe(OH)_2(S)$ — "Green rust" formulation
$4Fe^{3+}(aq) + 4H^-(aq) + O_2(aq) \rightarrow 4Fe^{3+}(aq) + 2H_2O(l)$ — "Red rust" formulation
$Fe^{3+}(aq) + 3OH^- \rightarrow Fe(OH)_3$ — Iron (III) hydroxide formulation
$4Fe + 3O_2 + 6H_2O \rightarrow 4Fe(OH)_3$ — Balanced equation for iron rusting
$3Fe(OH)_2 \rightarrow Fe_3O_4 + H_2 + 2H_2O$ — Schikorr reaction
$2Fe(OH)_3 \rightarrow Fe_2O_3 + 3H_2O$ — Dehydration of Iron(III) hydroxide

FIG. 2

CONTINUOUS ASSESSMENT OF WELL ELEMENTS USING FIBER OPTICS

CROSS-REFERENCE TO RELATED APPLICATION

This claims the benefit to U.S. Provisional Application No. 62/962,661 filed on Jan. 17, 2020, titled "Continuous Assessment of Well Elements Using Fiber Optics," the disclosure of which is hereby incorporated by reference in its entirety for all purposes.

TECHNICAL FIELD

The present disclosure relates generally to wellbore element inspection. More specifically, but not by way of limitation, this disclosure relates to inspection of wellbore elements using a fiber optic system within the wellbore.

BACKGROUND

An oil and gas well system may be used to extract hydrocarbons from a formation. Elements within a wellbore of the well system, such as casing or tubing, may provide conduits to transport the extracted hydrocarbons from the formation to a surface of the well system. It may be desirable for operators of the well system to inspect the wellbore elements. Available inspection technology for measuring defects, such as corrosion or damage, in the well elements may be limited to inspection during a brief period of time associated with a particular inspection process. That is, the inspection processes are limited to a snapshot of the conditions of the well elements. Further, available inspection technology may require inspection specific tools to be installed within the wellbore and may require production downtime during all or part of the inspection process.

BRIEF DESCRIPTION OF THE DRAWINGS

FIG. 2 is a sectional view of a corrosion process occurrence in a portion of production tubing or casing, according to at least one example of the present disclosure.

DETAILED DESCRIPTION

Figure 1:
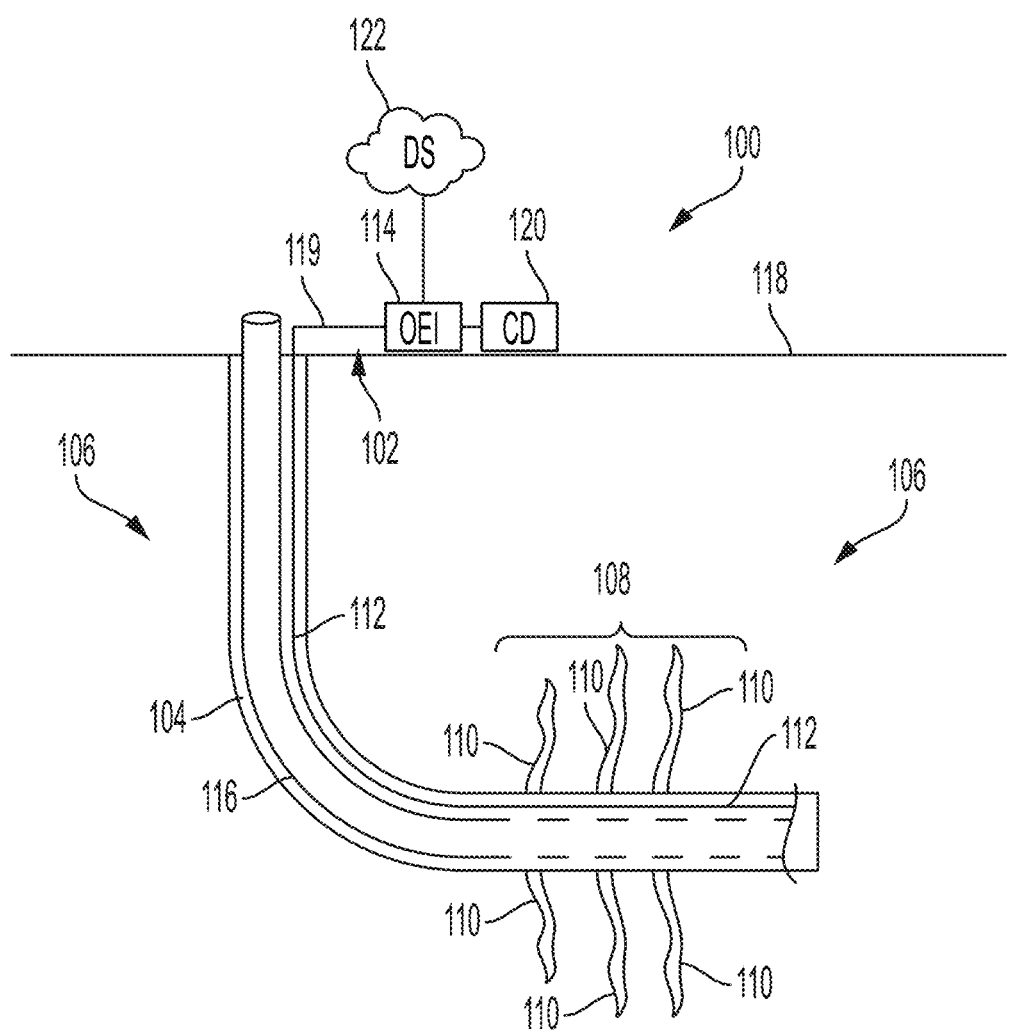
FIG. 1 is a schematic view of a well system with a distributed acoustic sensor for detecting acoustic signals, according to at least one example of the present disclosure.

Certain aspects and features relate to continuous and distributed real-time measurement, detection, and analysis of deterioration, such as corrosion or damage, across well elements, such as casing or tubing, using a fiber-optic cable or tube. In an example, a fiber optic system may detect corrosion occurrence in oil and gas and geothermal downhole wellbore elements using machine learning (ML) and artificial intelligence (AI) techniques. These techniques for detecting corrosion occurrence may lead to early prediction of failure, or a prediction of remaining useful life, of the wellbore elements due to corrosion or damage.

In an example, a method is used to determine well element deterioration. The method may also determine occurrence of corrosion and damage and the pace of the corrosion and damage. A fiber-optic cable or tube may absorb free hydrogen within a wellbore that results from the well element corrosion or damage. Detection of the absorption of the free hydrogen atoms by the fiber-optic cable or tube may be performed using a Rayleigh optical-time-domain-reflectometer (OTDR). Information may be captured and analyzed in real time by a computing system. The computing system may automatically analyze all detected events and learn patterns and trends of anomaly occurrence with machine learning (ML) and artificial intelligence (AI) techniques. The computing system may provide a mechanism to compare results with additional information from casing or tubing inspections where changes in pipe wall thickness are determined. Changes monitored by degradation of fiber optic performance due to the hydrogen absorption can also be compared to visual inspections with cameras for further analysis and data confirmation.

In an example, a 1244 nm wavelength laser OTDR, that is a hydrogen "gas-in-glass" laser OTDR, may be used for detection of free hydrogen absorption-induced optical transmission loss resulting from corrosion or damage of the wellbore elements. Other OTDRs with different wavelengths may also be used, such as OTDRs with wavelengths of 950 nm, 1310 nm, 1383 nm (i.e., SiOH), 1410 nm (i.e., GeOH), 1550 nm, 1625 nm, or a combination thereof. In some examples, the wavelengths may be within 10% of the wavelengths identified above. In an additional example, the wavelengths or bands of wavelengths may be between of 800 nm and 2100 nm Shortwave Distributed Temperature Sensing (DTS) interrogation wavelengths may also be used for detection of free hydrogen absorption. The shortwave DTS interrogation wavelengths may include 950 nm or 1083 nm infrared hydrogen absorption bands. Additionally, longwave DTS wavelengths of 1450 nm to 1650 nm may be employed to detect hydrogen absorption-induced optical transmission losses.

Machine-learning algorithms and artificial intelligence techniques may be used to learn, alarm, alert, and display occurrence patterns and material degradation pace across an entire length of the fiber-optic cable or tube. In some examples, the fiber-optic cable or tube may extend an entire length of the wellbore. The machine-learning algorithms and artificial intelligence techniques may also predict, in real time, element failure or remaining useful life based on a degradation rate for each location along a length of the fiber optical cable or tube.

The fiber-optic cable may be run with tubing, with casing, or with both tubing and casing. In some examples, the fiber-optic cable may be mechanically attached to the production tubing, to the casing, or to both the production tubing and the casing. Further, a pumpable fiber solution may be used. The pumpable fiber solution may provide a mechanism to exchange to a new fiber on demand. That is, the fiber-optic cable may be installed within the wellbore or removed from the wellbore after placement of the production tubing and the casing.

Real time investigation of material degradation, such as of casing or tubing within the wellbore, due to corrosion with a precise location of anomaly occurrence may lead to real-time corrosion management of the casing or tubing. Once corrosion can be observed in real time, the remediation actions to address the corrosion may provide significant cost savings for well intervention operations, recompletion operations, or plug and abandonment operations.

For example, the system may provide extended life of production tubing or casing as anomalies may be detected in an early stage. The early stage detection of anomalies may enable a repair using targeted interventions or remedial jobs, such as well recompletion or tubing and casing patches. The system may also enable planning of targeted or full recompletions in an efficient manner to reduce operational costs. The system may provide a mechanism to plan better wells in similar fields due to observed corrosion and damage occurrence or progression in certain material types and well conditions. Additionally, the system may enable an assessment for how much material (e.g., tubing elements not affected by damage or corrosion) can be reused in a recompletion. Further, the system may enable an assessment for how much material (e.g., casing elements) can be reused from plug and abandonment (PnA) operations.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic view of an example of a well system 100 with a distributed sensor 102 for detecting acoustic signals, according to at least one example of the present disclosure. A wellbore 104 may be created by drilling into a formation 106 (e.g., a hydrocarbon bearing formation). In some examples, the distributed sensor 102 may be installed within the wellbore 104 to accomplish a number of sensing tasks within the wellbore 104. For example, the distributed sensor 102 may be used to monitor hydraulic fracturing operations within the wellbore 104. To access hydrocarbons stored within the formation 106, the hydraulic fracturing operations may be conducted after the wellbore 104 is drilled. A hydraulic fracturing operation generally includes pumping hydraulic fracturing fluid under pressure into a section 108 of the wellbore 104. The pressure of the hydraulic fracturing fluid creates fractures 110 within the formation 106 near a fracturing plug positioned within the wellbore 104. Through these fractures 110, hydrocarbons are able to flow into the wellbore 104 more freely. In some examples, the wellbore 104 may be drilled into the formation 106 to access geothermal energy or water within the formation.

The distributed sensor 102 may include a length of fiber-optic cable 112 that extends along a length of the wellbore 104. Distributed sensing, such as distributed temperature sensing, that is performed by the distributed sensor 102 is a method of using nonlinearities in the fiber-optic cable 112 to detect temperature variations along the wellbore. Alternatively, acoustic vibrations surrounding the wellbore 104 or static strain along the wellbore 104 may also be detected using other distributed sensing approaches. Information may be collected from the distributed sensor 102 during a hydraulic fracturing operation and used to determine adjustments to parameters of the hydraulic fracturing operation. In other examples, the fiber-optic cable 112 may be installed within the wellbore 104 after completion of the wellbore 104 to monitor production activities.

As illustrated, the fiber-optic cable 112 may be communicatively coupled to an opto-electrical interface 114. In operation, the fiber-optic cable 112 and the opto-electrical interface 114 may be used to perform distributed sensing operations within the wellbore 104. For example, the fiber-optic cable 112 and the opto-electrical interface 114 may both be part of the distributed sensor 102. In an example, the opto-electrical interface 114 may inject optical signals into the fiber-optic cable 112 and detect variations in a reflected signal received from the fiber-optic cable 112. The variations in the reflected signals may be due to Brillouin, Raman, Rayleigh, Enhanced backscattering, or any combination thereof resulting from changes in absolute strain, temperature, acoustic vibration signals, or any combination thereof received along the fiber-optic cable 112. In the case of Enhanced backscattering in optical fibers, the fiber-optic cable 112 itself may be engineered to possess reflection enhancing features along a length of the cable 112 that offer greater signal strength compared with intrinsic Rayleigh backscatter alone. Such internal features of the cable 112 may include Fiber Bragg Gratings, microstructures, or a combination thereof within the glass fiber core.

In some examples, corrosion and damage on casing 116, or other tubing (not shown) within the casing 116, positioned proximate to the fiber-optic cable 112 may release free hydrogen. The fiber-optic cable 112 may absorb the free hydrogen. The variations in the reflection signal may be due to degradation of fiber optic performance in the fiber-optic cable 112 due to absorption of the free hydrogen by the fiber-optic cable 112.

In one or more examples, the opto-electrical interface 114 may be an optical-time-domain-reflectometer (OTDR), such as a Rayleigh OTDR. Other types of reflectometers may also be used. For example, the opto-electrical interface 114 may include a Brillouin OTDR, a Raman OTDR, or similar optical-frequency-domain-reflectometers (OFDRs). In another example, the opto-electrical interface 114 may be a distributed temperature sensor (DTS) interrogator. The distributed sensing operations performed by the distributed sensor 102 within the wellbore 104 may provide a mechanism to determine locations, magnitudes, and rates of corrosion or damage on the casing 116 or other tubing within the wellbore 104.

The fiber-optic cable 112 may be attached to an outer surface of the casing 116 within the wellbore 104, suspended from a surface 118 of the wellbore 104 between the casing 116 and a wall of the wellbore 104 (e.g., within cement between the casing 116 and the wall of the wellbore 104), or positioned within the casing 116. The fiber-optic cable 112 may also be attached to an outer surface of tubing, such as production tubing, within the casing 116, suspended from the surface 118 of the wellbore 104 between the casing 116 and the tubing within the casing 116, or positioned within the tubing itself within the casing 116. The opto-electrical interface 114 may be positioned at the surface 118 of the well system 100. The fiber-optic cable 112 may connect to the opto-electrical interface 114 with a subsea umbilical or a surface cable 119. In an example, the surface cable 119 and the fiber-optic cable 112 may be spliced together before the opto-electrical interface 114 is installed. The opto-electrical interface 114 may be responsible for transmission and reception of light into and from the fiber-optic cable 112 and processing of the light. In an example, the opto-electrical interface 114 may detect degradation of the fiber-optic cable 112 resulting from free-hydrogen absorption by the fiber-optic cable 112.

In one example, the opto-electrical interface 114 may include a computing device with a data acquisition system that can receive the optical information from the fiber-optic cable 112 and process the optical information using various analysis and visualization tools. The computing device of the opto-electrical interface 114 may include a processor and a non-transitory computer-readable medium that includes instructions that are executable by the processor to perform various operations described herein with regard to FIGS. 1-8.

The distributed sensor 102, which may include the fiber-optic cable 112 and the opto-electrical interface 114, is able to measure changes in clarity within the fiber-optic cable 112 at a number of locations along a length of the fiber-optic cable 112. For example, the distributed sensor 102 may measure degradation in clarity of the fiber-optic cable 112 in 1 meter increments (i.e., 1 meter gauge lengths) along the length of the fiber-optic cable 112. Other section lengths of the fiber-optic cable 112 that are either larger or smaller than 1 meter are also contemplated, such as 1 centimeter to 10 meter lengths. The distributed sensor 102 may continuously measure the changes along the fiber-optic cable 112 at a rate of approximately 10,000 to 50,000 measurements per second (10 kHz to 50 kHz), for example along approximately 10 km to 2 km wellbore lengths, respectively. A resulting data stream of measured optical signals is used in a processing algorithm to determine features associated with the measured acoustic signals.

In an example, the opto-electrical interface 114 may provide optical sensor data to a computing device 120. The computing device 120 may use the optical sensor data to identify corrosion or damage along the casing 116 or other wellbore tubing, generate an early prediction of failure of the casing 116 or other wellbore tubing, provide a prediction of remaining useful life of the casing 116 or other wellbore tubing, or perform a combination of these operations. Based on the identified corrosion or damage along the casing 116 or other wellbore tubing, the computing device 120 may initiate remediation actions to address the corrosion or damage. For example, the computing device 120 may initiate a repair process to begin repairing or replacing damaged portions of the casing 116 when the identified corrosion or damage is less than a remaining useful life threshold, such as when the remaining useful life of the damaged portion of the casing 116 is less than five years. In some examples, the remaining useful life threshold may also be more than five years or less than five years.

The opto-electrical interface 114 may either streamline data directly to the computing device 120, such as an edge analytics device, or transmit the data to a remote data server 122. The computing device 120 may perform on-site data gathering, pre-processing of data, and event or anomaly detection in an automated manner. A first layer of machine-learning algorithms or artificial intelligence may be embedded at the computing device 120 to provide real-time distributed measurement of corrosion or damage along the casing 116 or other tubing within the wellbore 104. In another example, the machine-learning algorithms and artificial intelligence may be part of a centralized computing system installed at the remote data server 122.

A corrosion detection and management system of the computing device 120 or the remote data server 122 may include real-time distributed detection and measurement of damage or corrosion. The corrosion detection and management system may also include automated analytics that measure corrosion pace, progression, occurrence, or a combination thereof. Additionally, the corrosion detection and management system may include the capability to integrate the corrosion detection with advanced video processing that includes pattern recognition using artificial intelligence. Further, the corrosion detection and management system may provide real-time failure or remaining useful life predictions for each measured element through machine-learning algorithms and artificial intelligence techniques.

FIG. 2 is a sectional view 200 of a corrosion process occurrence in a portion of tubing 202, according to at least one example of the present disclosure. The tubing 202 may be production tubing or casing, such as the casing 116, positioned within the wellbore 104. Well element corrosion may be a reaction that occurs after a portion of the tubing 202, or another well element, is damaged at a damage location 210, such as from mechanical damage. Ferric material from iron in the tubing 202 may react with water 204, which is present during a majority of a production lifecycle of the wellbore 104, to generate rust. When the rust ($Fe_2O_3$) 206 is created by the reaction of the iron in the tubing 202 with the water 204, free hydrogen 208, such as Protium atoms (H+) and Hydrogen ($H_2$ gas), may be released. Protium atoms (H+) and Hydrogen ($H_2$ gas) molecules may diffuse and be absorbed into metal tubulars, such as the tubing 202, and fiber-optic cables or silica optical fibers, such as the fiber-optic cable 112. Such absorption may be detected at various wavelengths by, for example, the opto-electrical interface 114 positioned at the surface 118 of the wellbore 104.

OTDR wavelengths may be chosen where optical loss, due to the presence of hydrogen in the optical fiber, is optimized. In an example, a 1244 nm wavelength laser OTDR, that is a hydrogen "gas-in-glass" laser OTDR, may be used for detection of free hydrogen absorption-induced optical transmission loss resulting from corrosion or damage of the wellbore elements. Other OTDRs with different wavelengths may also be used, such as OTDRs with wavelengths of 950 nm, 1310 nm, 1383 nm (i.e., SiOH), 1410 nm (i.e., GeOH), 1550 nm, 1625 nm, or a combination thereof. In some examples, the wavelengths may be within 10% of the wavelengths identified above. In an additional example, the wavelengths or bands of wavelengths may be between of 800 nm and 2100 nm. Shortwave Distributed Temperature Sensing (DTS) interrogation wavelengths may also be used for detection of free hydrogen absorption. The shortwave DTS interrogation wavelengths may include 950 nm or 1083 nm infrared hydrogen absorption bands. Additionally, longwave DTS wavelengths of 1450 nm to 1650 nm may be employed to detect hydrogen absorption-induced optical transmission losses.

A table 212 provides an indication of examples of chemical reactions 214 that may occur on the tubing 202 within the wellbore 104. The chemical reactions 214 can lead to the corrosion at the damage location 210 of the tubing 202. Further, a product of the chemical reactions 214 often includes protium or free hydrogen that is absorbable by the fiber-optic cable 112. Other chemical reactions may also occur on the tubing 202 that cause corrosion to the tubing 202 and result in the release of protium or free hydrogen.

Figure 3:
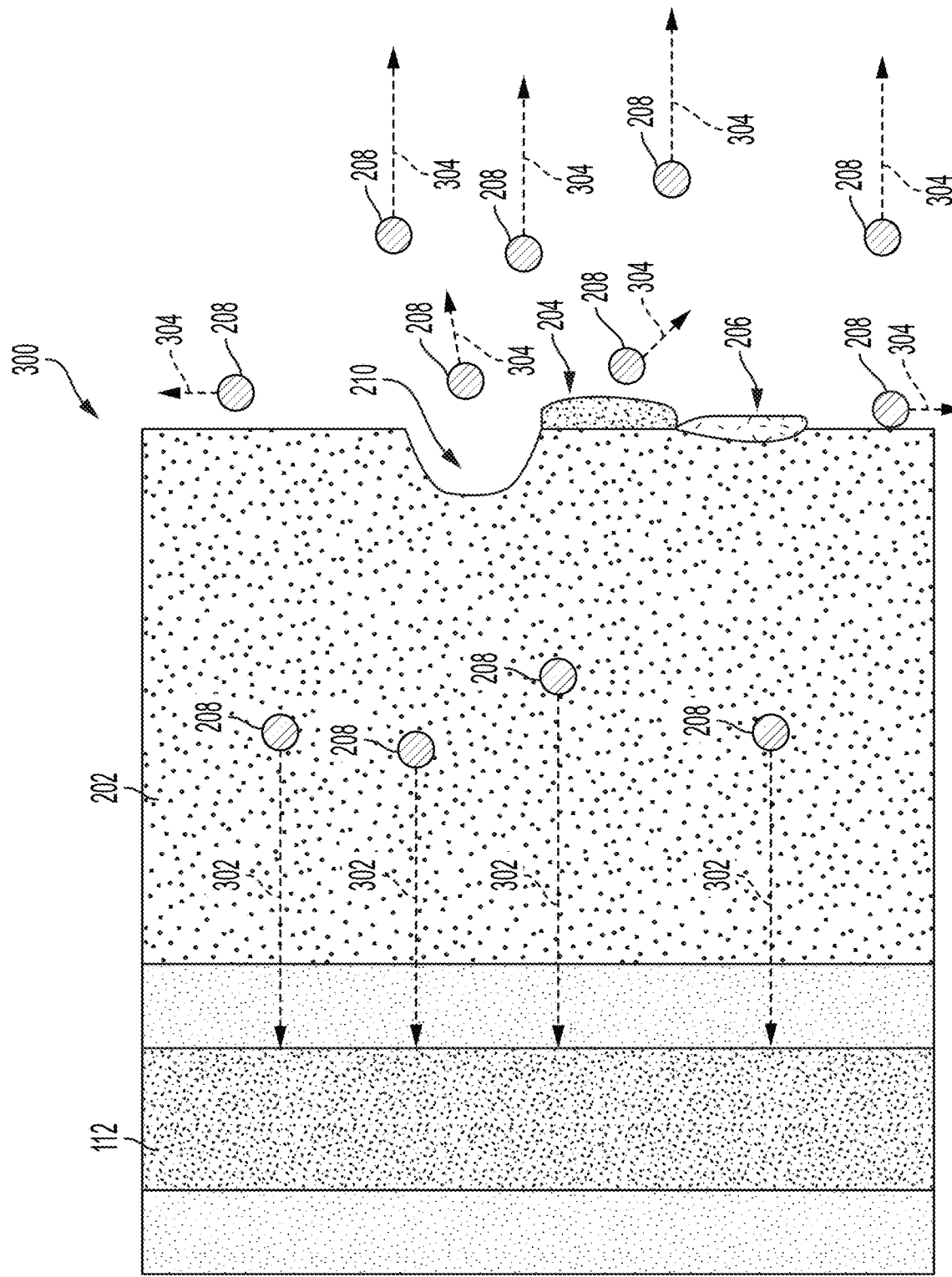
FIG. 3 is a sectional view of a corrosion process occurrence including migration of free hydrogen atoms toward a fiber-optic cable, according to at least one example of the present disclosure.

FIG. 3 is a sectional view 300 of a corrosion process occurrence including migration of the free hydrogen 208 toward the fiber-optic cable 112, according to at least one example of the present disclosure. In an example, the fiber-optic cable 112 may be mechanically coupled to, or otherwise positioned at, a portion of a length of the tubing 202 within the wellbore 104. The rust 206 may be generated as the tubing 202 corrodes, such as at the damage location 210 of the tubing 202.

The free hydrogen 208 may be released as a product of a chemical reaction that generates the rust 206, and the free hydrogen 208 may migrate in a direction 302 toward the fiber-optic cable 112. The free hydrogen 208 may also be released in other directions 304 away from the fiber-optic cable 112. A set portion of the free hydrogen 208 generated by a chemical reaction may be expected to migrate in the direction 302. Accordingly, the free hydrogen 208 migrating in the direction 304 away from the fiber-optic cable 112 may be disregarded for purposes of detecting damage or corrosion in the tubing 202 by the distributed sensor 102.

Figure 4:
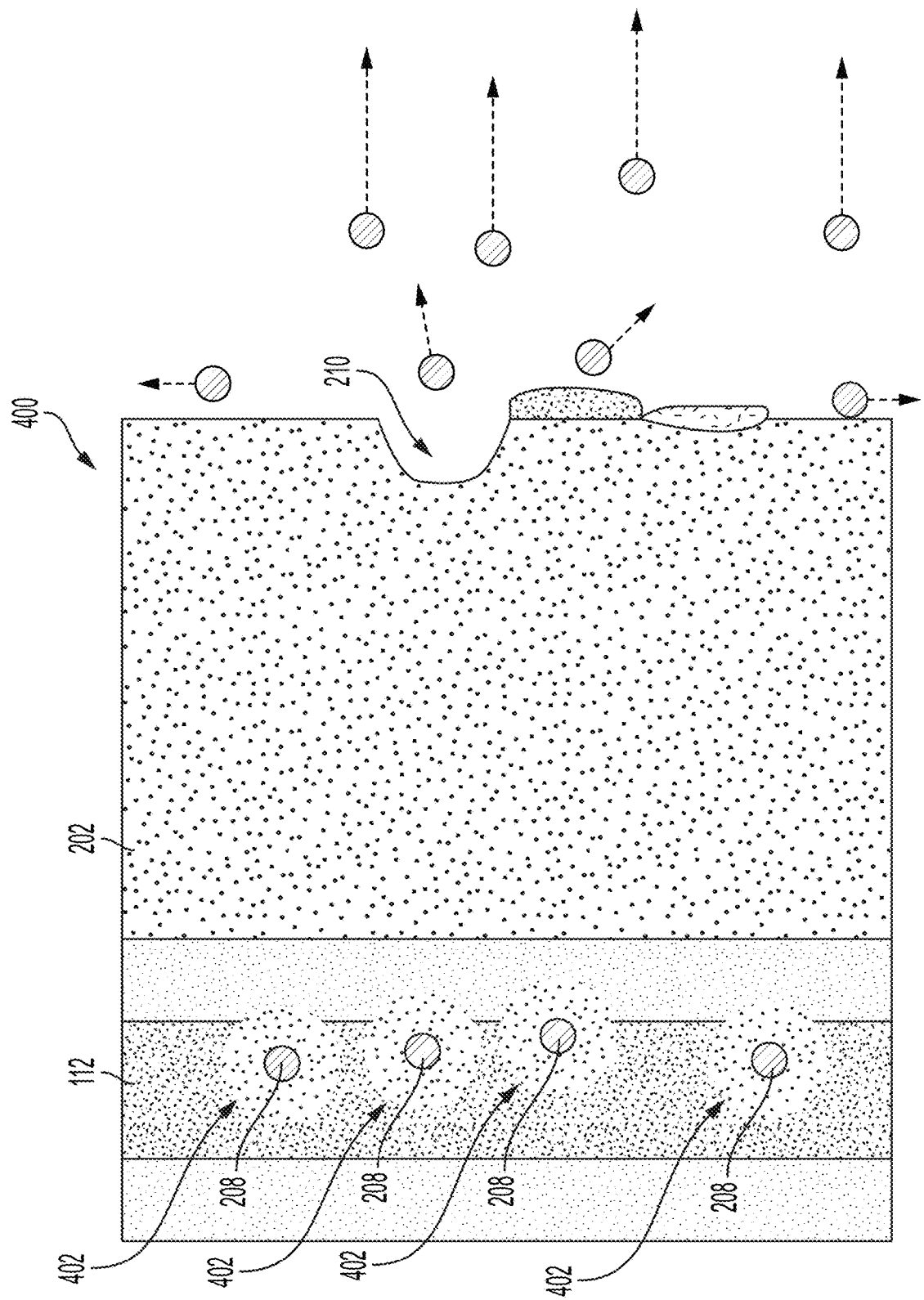
FIG. 4 is a sectional view of the corrosion process occurrence of FIG. 2 including absorption of the free hydrogen by the fiber-optic cable, according to at least one example of the present disclosure.

FIG. 4 is a sectional view 400 of the corrosion process occurrence including absorption of the free hydrogen 208 by the fiber-optic cable 112, according to one example of the disclosure. As illustrated, the absorption of the free hydrogen 208 by the fiber-optic cable 112 may result in fiber darkening 402 near the absorbed free hydrogen 208. The fiber darkening 402 near the absorbed free hydrogen 208 may be measured by the opto-electrical interface 114 that is in optical communication with the fiber-optic cable 112 at the surface 118 of the wellbore 104. The measurements of the fiber darkening may be used to determine the damage location of the tubing 202 from which the proximal fiber-optic cable 112 absorbs the free hydrogen 208 as a result of corrosion of the tubing 202.

The fiber darkening 402 of the fiber-optic cable 112 may be permanent. For example, once the free hydrogen 208 migrates to, and is absorbed by, the fiber-optic cable 112, the free hydrogen 208 may remain within that portion of the fiber-optic cable 112. In such an example, the fiber-optic cable 112 may be replaced when the optical loss in the fiber-optic cable 112 is excessive. Accordingly, the fiber-optic cable 112 may be a pumpable fiber solution that provides the ability to exchange fiber-optic cables 112 when such a replacement would be advantageous.

Figure 5:
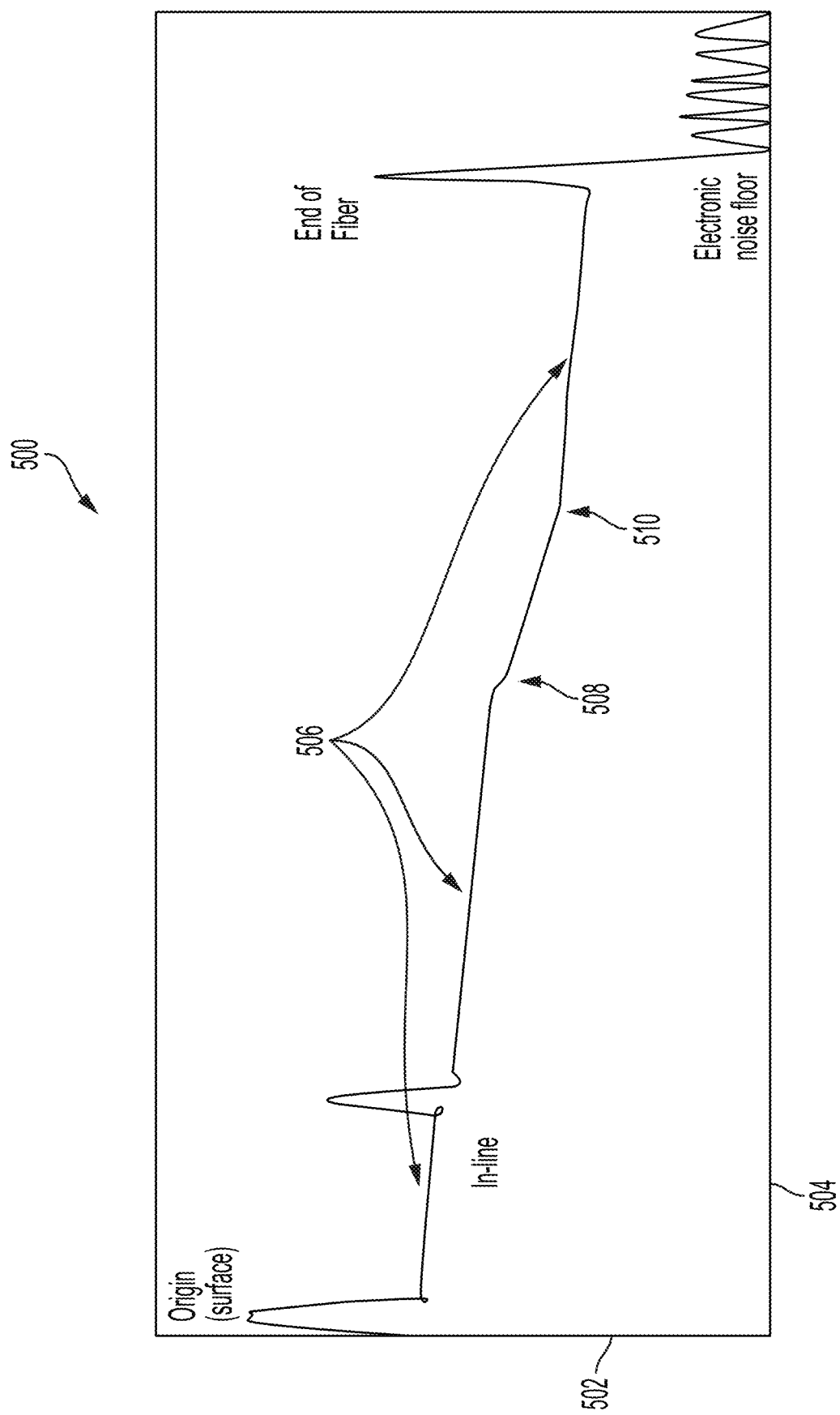
FIG. 5 is a graph illustrating free hydrogen detection in the fiber-optic cable, according to at least one example of the present disclosure.

FIG. 5 is a graph 500 illustrating free hydrogen detection in the fiber-optic cable 112, according to one example of the disclosure. A vertical axis 502 may represent optical loss of the fiber-optic cable 112, and a horizontal axis 504 may represent distance along the fiber-optic cable 112. As discussed above with respect to FIG. 4, the absorption of the free hydrogen 208 by the fiber-optic cable 112 may contribute to the fiber darkening 402 of the fiber-optic cable 112. The fiber darkening 402 may result in enhanced optical loss of the fiber-optic cable 112 at a location of the free hydrogen absorption. Accordingly, measuring the optical loss of the fiber-optic cable 112 may provide indications of where the free hydrogen 208 has been absorbed and where the damage location(s) 210 along the fiber-optic cable 112 may be.

The free hydrogen absorption detection may be performed using a 1244 nm, 1625 nm, or a combination thereof OTDR wavelength. In portions 506 of fiber-optic cable 112 without (or with limited) absorption of the free hydrogen 208, the optical loss may include a common slope. The common slope may represent optical loss resulting from the physics of the opto-electrical interface 114 and the fiber-optic cable 112.

The graph 500 also depicts sections 508 and 510 of optical loss associated with localized and distributed free hydrogen absorption in the fiber-optic cable 112. These sections 508 and 510 of optical loss include steep changes to the optical loss slope that is a result of the fiber darkening 402 in the fiber-optic cable 112. That is, the fiber darkening 402 prevents a greater amount of light from traversing the localized portion of the fiber-optic cable 112 than the portions 506 without the fiber darkening 402.

In some examples, reaction products of hydrogen, such as SiOH and GeOH, may also be detected and measured using different OTDR wavelengths. For example, a 1383 nm wavelength may be used to detect SiOH, and a 1410 nm wavelength may be used to detect GeOH. These OTDR wavelengths may show similar changes to the optical loss slope at the sections 508 and 510 that represent the fiber darkening 402 resulting from absorption of the free hydrogen 208 in the fiber-optic cable 112.

Figure 6:
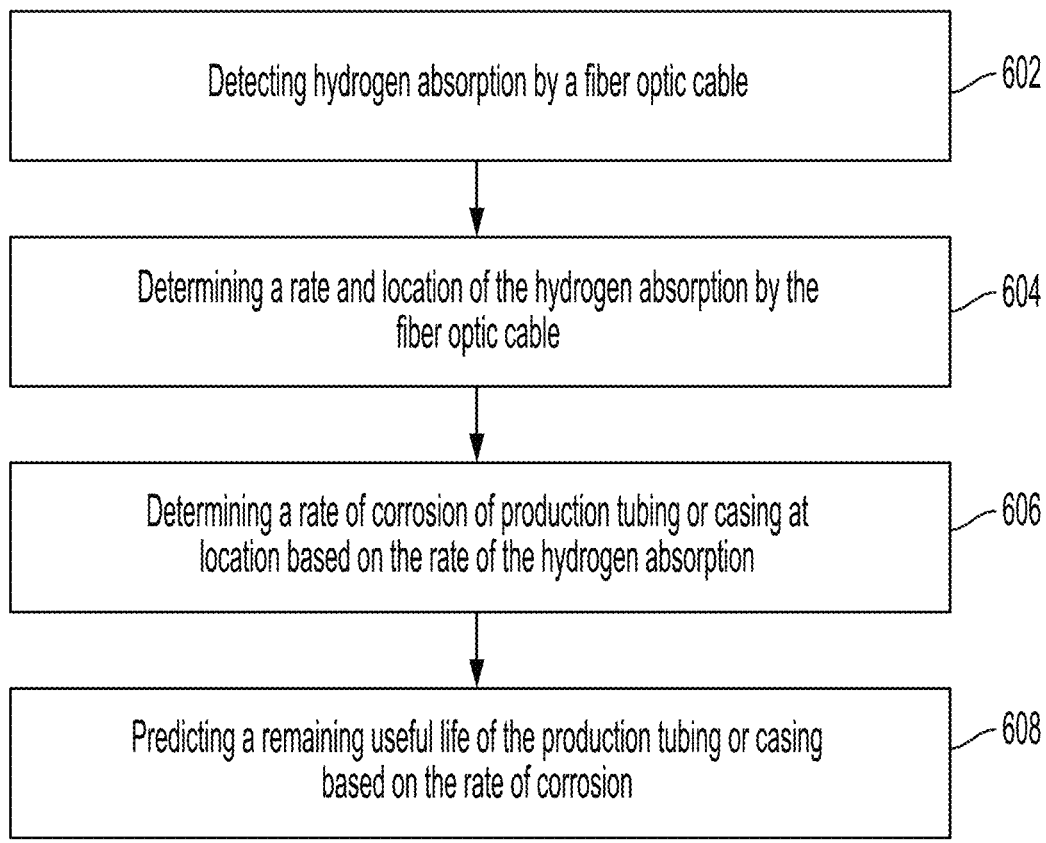
FIG. 6 is a flowchart of a process for predicting a remaining useful life of production tubing or casing, according to at least one example of the present disclosure.

FIG. 6 is a flowchart of a process 600 for predicting a remaining useful life of production tubing or casing, according to at least one example of the present disclosure. At block 602, the process 600 involves detecting free hydrogen absorption by the fiber-optic cable 112. The free hydrogen 208 may begin migrating during corrosion experienced by the tubing 202. As discussed above with respect to FIG. 4, the absorption of the free hydrogen 208 in the fiber-optic cable 112 may result in the fiber darkening 402 in the fiber-optic cable 112. Thus, detecting the absorption of the free hydrogen 208 in the fiber-optic cable 112 may involve detecting locations along the fiber-optic cable 112 where the optical loss in the fiber-optic cable 112 is greater than expected due to the fiber darkening 412.

At block 604, the process 600 involves determining a rate and a location of the free hydrogen absorption by the fiber-optic cable 112. The location of the absorption of the free hydrogen 208 may be determined based on locations, such as the sections 508 and 510 described above with respect to FIG. 5, of the fiber-optic cable 112 that experience greater than expected optical loss. Further, the rate of the absorption of free hydrogen 208 may be determined by observing the optical loss at the locations of the free hydrogen absorption continuously over time. For example, the optical loss increase over time may provide an indication of the rate of corrosion of the tubing 202 occurring at a particular location along the fiber-optic cable 112.

At block 606, the process 600 involves determining a rate of corrosion of the tubing 202 at the location of the hydrogen absorption based on the rate of the hydrogen absorption by the fiber-optic cable 112. Because the rate of absorption of the free hydrogen 208 by the fiber-optic cable 112 is directly related to the rate of corrosion of the tubing 202, the rate of corrosion of the tubing 202 may be determined by observing the rate of absorption of the free hydrogen 208 by the tubing 202. In some examples, a machine learning model trained to determine corrosion rates of the tubing 202 may receive the detected rate of absorption of the free hydrogen 208 and output a rate of corrosion of the tubing 202. In other examples, a look-up table may be implemented that correlates the detected rate of absorption of the free hydrogen 208 in the fiber-optic cable 112 to the rate of corrosion of the tubing 202.

At block 608, the process 600 involves predicting a remaining useful life of the tubing 202 based on the rate of corrosion of the tubing 202. In some examples, a machine learning model trained to determine remaining useful life of the tubing 202 based on the rate of corrosion of the tubing 202 may be utilized. For example, the machine learning model may use the rate of corrosion of the tubing 202 to generate the remaining useful life of the tubing 202. In an example, the machine learning model may be trained in a supervised or semi-supervised manner based on data obtained from historical well tubing corrosion.

In an example, the changes monitored by degradation of the performance of the fiber-optic cable 112 due to the free hydrogen absorption can also be compared to visual inspections with cameras for further analysis and data confirmation. For example, a ground truth used to train the machine learning model may involve data confirmation from a camera that corrosion is occurring at the location identified by the fiber-optic cable 112. As a corpus of data used in the machine learning model increases, the accuracy and robustness of the machine learning model may also increase.

In one or more examples, the prediction of the remaining useful life of the tubing 202 may trigger remedial actions. For example, if the remaining useful life of a section of the tubing 202 is predicted to be less than 5 years due to expected corrosion of the tubing 202, the computing device 120 may initiate a tubing repair or replacement process. The tubing or repair process may remediate damage to the tubing 202 as a result of the corrosion. Remediation of the damage to the tubing 202 may extend the remaining useful life of the tubing 202.

Figure 7:
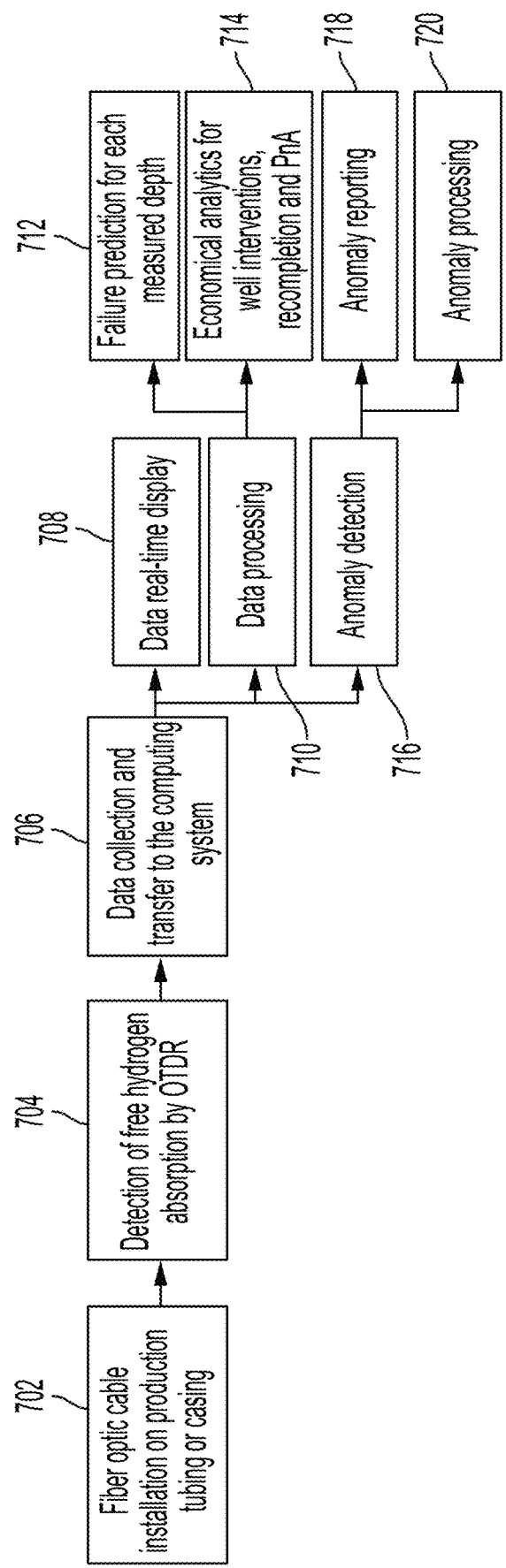
FIG. 7 is a flowchart of a process for corrosion and damage data capture, according to at least one example of the present disclosure.

FIG. 7 is a flowchart describing a process 700 for corrosion and damage data capture, according to one example of the disclosure. At block 702, the process 700 involves installing the fiber-optic cable 112 on the tubing 202. In some examples, the fiber-optic cable 112 may be mechanically attached the tubing 202 at the surface 118 of the well system 100 prior to installing the tubing 202 within the wellbore 104. In other examples, the fiber-optic cable 112 may be run into the wellbore 104 after the tubing has already been installed.

At block 704, the process 700 involves detecting absorption of the free hydrogen 208 by the fiber-optic cable 112 using an optical time domain reflectometer, such as the opto-electrical interface 114. The free hydrogen 208 may begin migrating during corrosion experienced by the tubing 202. As discussed above with respect to FIG. 4, the absorption of the free hydrogen 208 in the fiber-optic cable 112 may result in the fiber darkening 402 in the fiber-optic cable 112. Accordingly, detecting the absorption of the free hydrogen 208 by the fiber-optic cable 112 may involve detecting locations along the fiber-optic cable 112 where the optical loss in the fiber-optic cable 112 is greater than expected due to the fiber darkening 412.

At block 706, the process 700 involves collecting data from the opto-electrical interface 114 and transferring the data to the computing device 120 or the remote data server 122. The computing device 120 or the remote data server 122 may perform additional processing on the data collected from the opto-electrical interface 114 to output information useful to an operator of the well system 100.

At block 708, the process 700 involves the computing device 120 outputting the data collected from the opto-electrical interface 114 in a real-time display. For example, the computing device 120 may output the graph 500. As discussed above, the graph 500 provides an indication of optical loss of the fiber-optic cable 112 over a length of the fiber-optic cable 112. The graph 500 may provide an immediate visual to the operator of the well system 100 of the locations along the fiber-optic cable 112 experiencing the fiber darkening 402 resulting from corrosion of the tubing 202.

At block 710, the process 700 involves additional data processing of the data collected from the opto-electrical interface 114. The additional data processing may be performed using the computing device 120 or the remote data server 122. In some examples, the additional data processing may provide an operator of the well system 100 with additional information about the present or future status of the tubing 202 within the wellbore 104.

In an example, a comparison of the data observed from the opto-electrical interface 114 with historical data of tubing or casing inspections may be performed. This comparison may be performed in real time to monitor occurrence or progression of corrosion. A comparison of the data with video from downhole cameras with advanced video analytics may also be performed. This comparison with the video may be completed through artificial intelligence as a next line of confirmation of the changes to the tubing or casing. Additionally, a comparison of the observed data with three-dimensional images from tubing or casing inspections may be performed to complement analytics with evidence where damage or corrosion occurs (e.g., internally or externally). Further, economical calculations may be performed regarding a cost of material that can be reused or that has to be exchanged.

For example, at block 712, the process 700 involves predicting failure timelines or remaining useful life of the tubing 202 at each measure depth of the fiber-optic cable 112. For example, the computing device 120 or the remote data server may leverage a machine learning model that uses data from the fiber-optic cable 112 to predict a remaining useful life for the tubing 202 based on corrosion of the tubing 202 and corrosion rates of the tubing 202 detected from the absorption of the free hydrogen 208 by the fiber-optic cable 112.

At block 714, the process 700 involves providing economical analytics associated with the tubing 202. For example, based on the remaining useful life of the tubing 202, well interventions may be contemplated to remediate any damage to the tubing 202 detected by the opto-electrical interface 114. The computing device 120 may provide an economic analysis associated with performing such a well intervention. Likewise, economics associated with recompletion of the wellbore 104 based on the detected damage to the tubing 202 may be contemplated. Further, the computing device 120 may provide an assessment for how much material (e.g., casing elements) can be reused from plug and abandonment (PnA) operations based on the detection of the damage to the tubing 202 from corrosion.

At block 716, the process 700 involves providing anomaly detection to an operator of the well system 100. While block 708 involves a real-time display of the data collected by the opto-electrical interface 114, block 716 involves explicitly detecting anomalies along the tubing 202.

For example, at block 718, the process 700 may involve reporting anomalies, such as damage to the tubing 202 resulting from corrosion, along the tubing 202 detected by the opto-electrical interface 114. In an example, the location of the anomalies along the tubing 202 may be output by the computing device 120 or the remote data server 122 to provide the operator of the well system 100 with an indication of the anomaly.

Further, at block 720, the process 700 may involve processing the anomaly reported at block 718. In an example, processing the anomaly may involve detecting a rate of corrosion of the tubing 202 at the anomaly location. Using the rate of corrosion of the tubing 202, the computing device 120 or the remote data server 122 can provide details about the extent of the damage to the tubing 202 at the location associated with the anomaly. Additionally, the computing device 120 or the remote data server 122 may provide continuous indications of rates of corrosion at a number of locations along the length of the tubing 202.

Figure 8:
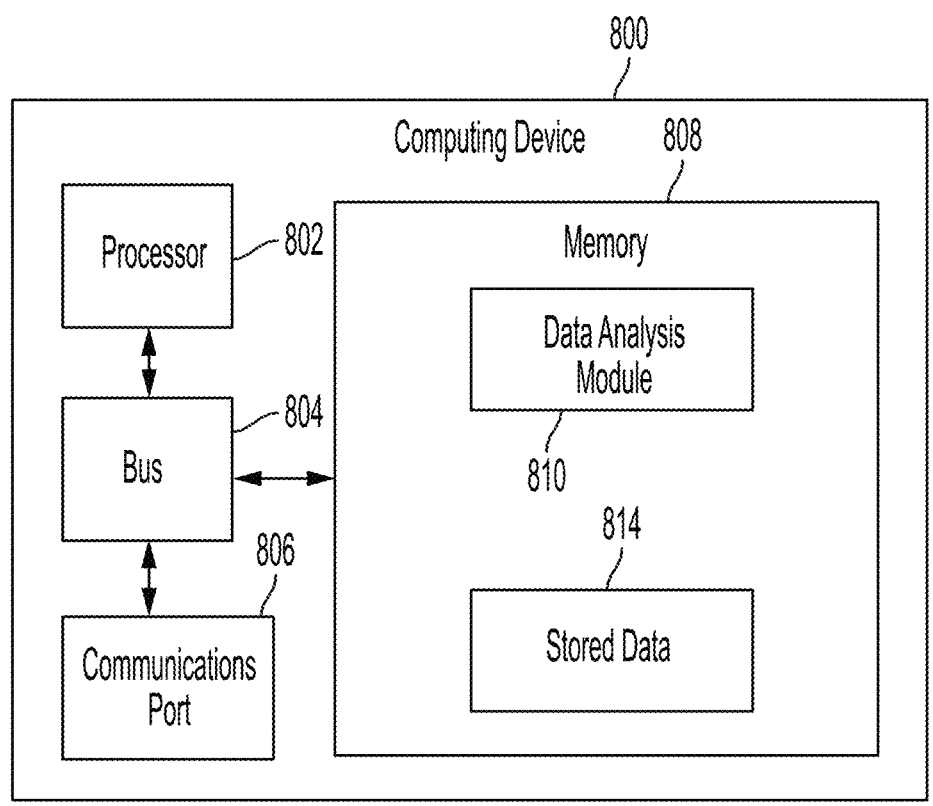
FIG. 8 is an example of a computing device capable of performing operations described with respect to FIGS. 1-7, according to at least one example of the present disclosure.

FIG. 8 is a computing device 800, such as the computing device 120 or the remote data server 122, capable of performing the operations described above with respect to FIGS. 1-7, according to at least one example of the present disclosure. The computing device 800 can include a processor 802, a bus 804, a communications port 806, and a memory 808. In some examples, the components shown in FIG. 8 (e.g., the processor 802, the bus 804, the communications port 806, and the memory 808) can be integrated into a single structure. For example, the components can be within a single housing. In other examples, the components shown in FIG. 8 can be distributed (e.g., in separate housings) and in electrical communication with each other.

The processor 802 can execute one or more operations for implementing some examples of the present disclosure for detecting deterioration, such as corrosion or damage, of tubing or casing within a wellbore. The processor 802 can execute instructions stored in the memory 808 to perform the operations. The processor 802 can include one processing device or multiple processing devices. Non-limiting examples of the processor 802 include a Field-Programmable Gate Array ("FPGA"), an application-specific integrated circuit ("ASIC"), a microprocessor, etc.

The processor 802 can be communicatively coupled to the memory 808 via the bus 804. The non-volatile memory 808 may include any type of memory device that retains stored information when powered off. Non-limiting examples of the memory 808 include electrically erasable and programmable read-only memory ("EEPROM"), flash memory, or any other type of non-volatile memory. In some examples, at least some of the memory 808 can include a medium from which the processor 802 can read instructions. A non-transitory, computer-readable medium can include electronic, optical, magnetic, or other storage devices capable of providing the processor 802 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C#, etc.

The communications port 806 can be used to communicate with the external systems or devices, such as sensors gathering data in a wellbore environment (e.g., the opto-electrical interface 114). Sensor data received by the communications port 806 can be transmitted to the memory 808 via the bus 804 for storage as stored data 814.

The memory 808 can include program code for a data analysis module 810 that can be executed for causing the computing device to perform operations according to various examples of the present disclosure. In an example, the data analysis module 810 may include the machine learning model. In an example, the computing device 800 may apply the data received from the opto-electrical interface 114 to the machine learning module to identify a rate of corrosion of the tubing 202, a remaining useful life of the tubing 202, or a combination thereof.

By using certain examples of the present disclosure, wellbore tubing corrosion can be detected and a remaining useful life of the wellbore tubing can be predicted for controlling wellbore environments.

As used below, any reference to a series of examples is to be understood as a reference to each of those examples disjunctively (e.g., "Examples 1-4" is to be understood as "Examples 1, 2, 3, or 4").

Example 1 is a well system, comprising: a fiber-optic cable positionable downhole along a length of a wellbore; an opto-electrical interface to communicatively couple to the fiber-optic cable to monitor a gas released from a well element within the wellbore; a processing device; and a memory device that includes instructions executable by the processing device to cause the processing device to: detect hydrogen absorption by the fiber-optic cable within the wellbore; and determine a location of deterioration of the well element in the wellbore based on the detected hydrogen absorption by the fiber-optic cable.

Example 2 is the well system of example 1, wherein the instructions are further executable by the processing device to cause the processing device to: determine a rate of the hydrogen absorption by the fiber-optic cable; determine a rate of deterioration of the well element at the location of deterioration based on the rate of the hydrogen absorption; and predict a remaining useful life of the well element at the location based on the rate of deterioration.

Example 3 is the well system of example 2, wherein the instructions are further executable by the processing device to cause the processing device to: in response to the remaining useful life of the well element being less than a remaining useful life threshold, initiate a remediation operation of the well element to repair the well element at the location.

Example 4 is the well system of example 2, wherein predicting the remaining useful life of the well element comprises applying data associated with detecting the hydrogen absorption by the fiber-optic cable to a machine-learning algorithm trained to predict the remaining useful life.

Example 5 is the well system of examples 1-4, wherein the gas released from the well element comprises free hydrogen and is monitored by the opto-electrical interface and the fiber-optic cable using Rayleigh scattering, Brillouin scattering, Raman scattering, Enhanced scattering, or a combination thereof.

Example 6 is the well system of examples 1-5, wherein light pulses transmitted from the opto-electrical interface into the fiber-optic cable comprise wavelengths or bands of wavelengths between of 800 nm and 2100 nm.

Example 7 is the well system of examples 1-6, wherein the opto-electrical interface comprises a Rayleigh optical time domain reflectometer.

Example 8 is the well system of examples 1-7, wherein the fiber-optic cable is pumpable into the wellbore after the well element is installed within the wellbore.

Example 9 is the well system of examples 1-8, wherein the opto-electrical interface comprises a distributed temperature sensing interrogator.

Example 10 is a method, comprising: detecting hydrogen absorption by a fiber-optic cable within a wellbore, wherein the fiber-optic cable is positioned proximate a wellbore tubing within the wellbore; determining a location of the detected hydrogen absorption and a rate of the hydrogen absorption by the fiber-optic cable; determining a rate of deterioration of the wellbore tubing at the location based on the rate of the hydrogen absorption; predicting a remaining useful life of the wellbore tubing at the location based on the rate of deterioration; and in response to the remaining useful life of the wellbore tubing being less than a remaining useful life threshold, initiating a remediation operation of the wellbore tubing to repair the wellbore tubing at the location.

Example 11 is the method of example 10, wherein predicting the remaining useful life of the wellbore tubing comprises applying data associated with detecting the hydrogen absorption by the fiber-optic cable to a machine-learning algorithm trained to predict the remaining useful life.

Example 12 is the method of examples 10-11, wherein the detected hydrogen absorption by the fiber-optic cable results from a release of free hydrogen from corrosion occurring along the wellbore tubing.

Example 13 is the method of examples 10-12, wherein detecting the hydrogen absorption is performed using Rayleigh scattering, Brillouin scattering, Raman scattering, Enhanced scattering, or a combination thereof.

Example 14 is the method of examples 10-13, wherein detecting the hydrogen absorption is performed by detecting optical loss within the fiber-optic cable.

Example 15 is the method of examples 10-14, wherein detecting the hydrogen absorption by the fiber-optic cable is performed using an opto-electrical interface that transmits light pulses comprising wavelengths or bands of wavelengths between 800 nm and 2100 nm into the fiber-optic cable.

Example 16 is a non-transitory computer-readable medium comprising instructions that are executable by a processing device for causing the processing device to perform operations comprising: detecting hydrogen absorption by a fiber-optic cable within a wellbore, wherein the fiber-optic cable is positioned proximate a wellbore tubing within the wellbore; determining a location of the detected hydrogen absorption and a rate of the hydrogen absorption by the fiber-optic cable; determining a rate of deterioration of the wellbore tubing at the location using the rate of the hydrogen absorption; and predicting a remaining useful life of the wellbore tubing at the location using the rate of deterioration.

Example 17 is the non-transitory computer-readable medium of example 16, wherein the operation of predicting the remaining useful life of the wellbore tubing comprises applying data associated with detecting the hydrogen absorption by the fiber-optic cable to a machine-learning algorithm trained to predict the remaining useful life.

Example 18 is the non-transitory computer-readable medium of examples 16-17, wherein the detected hydrogen absorption by the fiber-optic cable results from a release of free hydrogen from corrosion occurring along the wellbore tubing.

Example 19 is the non-transitory computer-readable medium of examples 16-18, wherein the operation of detecting the hydrogen absorption comprises controlling an opto-electrical interface communicatively coupled to the fiber-optic cable to perform a Rayleigh scattering operation, a Brillouin scattering operation, a Raman scattering operation, an Enhanced scattering operation, or a combination thereof.

Example 20 is the non-transitory computer-readable medium of examples 16-19, wherein the operation of detecting the hydrogen absorption is performed by detecting optical loss within the fiber-optic cable.

The foregoing description of certain embodiments, including illustrated embodiments, has been presented only for the purpose of illustration and description and is not intended to be exhaustive or to limit the disclosure to the precise forms disclosed. Numerous modifications, adaptations, combinations, and uses thereof are possible without departing from the scope of the disclosure.

What is claimed is:

1. A well system, comprising:
    a fiber-optic cable positionable downhole along a length of a wellbore;
    an opto-electrical interface to communicatively couple to the fiber-optic cable to monitor a gas released from a well element within the wellbore;
    a processing device; and
    a memory device that includes instructions executable by the processing device to cause the processing device to:
        detect hydrogen absorption by the fiber-optic cable within the wellbore;
        determine a location of deterioration of the well element in the wellbore based on the detected hydrogen absorption by the fiber-optic cable;
        determine a rate of the hydrogen absorption by the fiber-optic cable;
        determine a rate of deterioration of the well element at the location of deterioration based on the rate of the hydrogen absorption; and
        predict a remaining useful life of the well element at the location based on the rate of deterioration.

2. The well system of claim 1, wherein the instructions are further executable by the processing device to cause the processing device to:
    in response to the remaining useful life of the well element being less than a remaining useful life threshold, initiate a remediation operation of the well element to repair the well element at the location.

3. The well system of claim 1, wherein predicting the remaining useful life of the well element comprises applying data associated with detecting the hydrogen absorption by the fiber-optic cable to a machine-learning algorithm trained to predict the remaining useful life.

4. The well system of claim 1, wherein the gas released from the well element comprises free hydrogen and is monitored by the opto-electrical interface and the fiber-optic cable using Rayleigh scattering, Brillouin scattering, Raman scattering, Enhanced scattering, or a combination thereof.

5. The well system of claim 1, wherein light pulses transmitted from the opto-electrical interface into the fiber-optic cable comprise wavelengths or bands of wavelengths between of 800 nm and 2100 nm.

6. The well system of claim 1, wherein the opto-electrical interface comprises a Rayleigh optical time domain reflectometer.

7. The well system of claim 1, wherein the fiber-optic cable is pumpable into the wellbore after the well element is installed within the wellbore.

8. The well system of claim 1, wherein the opto-electrical interface comprises a distributed temperature sensing interrogator.

9. A method, comprising:
    detecting hydrogen absorption by a fiber-optic cable within a wellbore, wherein the fiber-optic cable is positioned proximate a wellbore tubing within the wellbore;
    determining a location of the detected hydrogen absorption and a rate of the hydrogen absorption by the fiber-optic cable;
    determining a rate of deterioration of the wellbore tubing at the location based on the rate of the hydrogen absorption;
    predicting a remaining useful life of the wellbore tubing at the location based on the rate of deterioration; and
    in response to the remaining useful life of the wellbore tubing being less than a remaining useful life threshold, initiating a remediation operation of the wellbore tubing to repair the wellbore tubing at the location.

10. The method of claim 9, wherein predicting the remaining useful life of the wellbore tubing comprises applying data associated with detecting the hydrogen absorption by the fiber-optic cable to a machine-learning algorithm trained to predict the remaining useful life.

11. The method of claim 9, wherein the detected hydrogen absorption by the fiber-optic cable results from a release of free hydrogen from corrosion occurring along the wellbore tubing.

12. The method of claim 9, wherein detecting the hydrogen absorption is performed using Rayleigh scattering, Brillouin scattering, Raman scattering, Enhanced scattering, or a combination thereof.

13. The method of claim 9, wherein detecting the hydrogen absorption is performed by detecting optical loss within the fiber-optic cable.

14. The method of claim 9, wherein detecting the hydrogen absorption by the fiber-optic cable is performed using an opto-electrical interface that transmits light pulses comprising wavelengths or bands of wavelengths between 800 nm and 2100 nm into the fiber-optic cable.

15. A non-transitory computer-readable medium comprising instructions that are executable by a processing device for causing the processing device to perform operations comprising:
    detecting hydrogen absorption by a fiber-optic cable within a wellbore, wherein the fiber-optic cable is positioned proximate a wellbore tubing within the wellbore;
    determining a location of the detected hydrogen absorption and a rate of the hydrogen absorption by the fiber-optic cable;
    determining a rate of deterioration of the wellbore tubing at the location using the rate of the hydrogen absorption; and
    predicting a remaining useful life of the wellbore tubing at the location using the rate of deterioration.

16. The non-transitory computer-readable medium of claim 15, wherein the operation of predicting the remaining useful life of the wellbore tubing comprises applying data associated with detecting the hydrogen absorption by the fiber-optic cable to a machine-learning algorithm trained to predict the remaining useful life.

17. The non-transitory computer-readable medium of claim 15, wherein the detected hydrogen absorption by the fiber-optic cable results from a release of free hydrogen from corrosion occurring along the wellbore tubing.

18. The non-transitory computer-readable medium of claim 15, wherein the operation of detecting the hydrogen absorption comprises controlling an opto-electrical interface communicatively coupled to the fiber-optic cable to perform a Rayleigh scattering operation, a Brillouin scattering operation, a Raman scattering operation, an Enhanced scattering operation, or a combination thereof.

19. The non-transitory computer-readable medium of claim 15, wherein the operation of detecting the hydrogen absorption is performed by detecting optical loss within the fiber-optic cable.

* * * * *